(12) United States Patent
Sharma et al.

(10) Patent No.: US 12,515,688 B2
(45) Date of Patent: Jan. 6, 2026

(54) POTHOLE DETECTION AND CLASSIFICATION

(71) Applicant: GM Global Technology Operations LLC, Detroit, MI (US)

(72) Inventors: Manoj Sharma, Troy, MI (US); Joseph F. Szczerba, Grand Blanc, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 447 days.

(21) Appl. No.: 18/183,403

(22) Filed: Mar. 14, 2023

(65) Prior Publication Data
US 2024/0308534 A1    Sep. 19, 2024

(51) Int. Cl.
| | |
|---|---|
| *B60W 50/14* | (2020.01) |
| *B60K 35/65* | (2024.01) |
| *B60W 40/06* | (2012.01) |
| *G06V 10/141* | (2022.01) |
| *G06V 10/70* | (2022.01) |

(Continued)

(52) U.S. Cl.
CPC ............. *B60W 50/14* (2013.01); *B60K 35/65* (2024.01); *B60W 40/06* (2013.01); *G06V 10/141* (2022.01); *G06V 10/70* (2022.01); *G06V 20/588* (2022.01); *B60K 35/23* (2024.01); *B60K 35/28* (2024.01); *B60K 35/60* (2024.01); *B60K 2360/176* (2024.01); *B60K 2360/177* (2024.01); *B60K 2360/334* (2024.01); *B60K 2360/785* (2024.01); *B60W 2050/146* (2013.01); *B60W 2420/403* (2013.01); *B60W 2540/223* (2020.02); *B60W 2552/35* (2020.02); *B60W 2556/30* (2020.02); *B60W 2556/50* (2020.02)

(58) Field of Classification Search
CPC .... G06V 10/141; G06V 10/70; G06V 20/588; B60W 50/14; B60W 40/06; B60W 2556/50; B60W 2050/146; B60W 2420/403; B60K 35/65; B60K 2360/785; B60K 35/28; B60K 35/23; B60K 2360/176; B60K 35/60; B60K 2360/334; B60K 2360/177

See application file for complete search history.

(56) References Cited

U.S. PATENT DOCUMENTS

2020/0361371 A1* 11/2020 Hallundbæk ........ B60Q 1/5037
2022/0324421 A1* 10/2022 Giovanardi .......... G08G 1/0145

(Continued)

*Primary Examiner* — Andrea C Leggett
(74) *Attorney, Agent, or Firm* — Vivacqua Crane, PLLC

(57) ABSTRACT

A system for determining a condition of a roadway a vehicle is traveling on includes an illumination device, a camera, a display, and a vehicle controller in electrical communication with the illumination device, the camera, and the display. The vehicle controller is programmed to project the light beam onto the roadway surface using the illumination device. The vehicle controller is further programmed to capture a plurality of images of the light beam on the roadway surface using the camera as the vehicle is in motion. The vehicle controller is further programmed to determine a severity of a deformation in the roadway surface based at least in part on the plurality of images of the light beam on the roadway surface. The vehicle controller is further programmed to notify the occupant of the vehicle using the display based on the severity of the deformation in the roadway surface.

18 Claims, 8 Drawing Sheets

(51) Int. Cl.
  *G06V 20/56* (2022.01)
  *B60K 35/23* (2024.01)
  *B60K 35/28* (2024.01)
  *B60K 35/60* (2024.01)

(56) References Cited

U.S. PATENT DOCUMENTS

2024/0101018 A1\* 3/2024 Monteuuis ....... G08G 1/096716
2024/0159518 A1\* 5/2024 Wang .................... G01S 7/4815

\* cited by examiner

POTHOLE DETECTION AND CLASSIFICATION

The present disclosure relates to systems and methods for increasing occupant awareness for a vehicle, and more particularly, to systems and methods for determining roadway condition for a vehicle.

To increase occupant comfort, convenience, and awareness, vehicles may be equipped with Advanced Driver Assistance Systems (ADAS) which are designed to assist the occupant in operating the vehicle. ADAS systems may use various sensors such as cameras, radar, and LiDAR to detect and identify objects around the vehicle, including other vehicles, pedestrians, and traffic signs. When a potential collision or obstacle is detected, the ADAS system may issue an alert to the occupant or take corrective action to prevent or mitigate the collision. However, current ADAS systems may not account for all possible driving scenarios and may not detect certain obstacles on the roadway which can impact the vehicle's handling or ride quality.

Thus, while current ADAS systems and methods achieve their intended purpose, there is a need for a new and improved system and method for determining a condition of a roadway a vehicle is traveling on.

SUMMARY

According to several aspects, a system for determining a condition of a roadway a vehicle is traveling on is provided. The system includes an illumination device configured to project a light beam onto a roadway surface. The system also includes a camera configured to capture an image of the light beam on the roadway surface. The system also includes a display configured to provide information related to the condition of the roadway to an occupant of the vehicle. The system also includes a vehicle controller in electrical communication with the illumination device, the camera, and the display. The vehicle controller is programmed to project the light beam onto the roadway surface using the illumination device. The vehicle controller is further programmed to capture a plurality of images of the light beam on the roadway surface using the camera as the vehicle is in motion. The vehicle controller is further programmed to determine a severity of a deformation in the roadway surface based at least in part on the plurality of images of the light beam on the roadway surface. The vehicle controller is further programmed to notify the occupant of the vehicle using the display based at least in part on the severity of the deformation in the roadway surface.

In another aspect of the present disclosure, to determine the severity of the deformation in the roadway surface, the vehicle controller is further programmed to generate a plurality of one-dimensional deformation matrices based at least in part on the plurality of images. To determine the severity of the deformation in the roadway surface, the vehicle controller is further programmed to generate a two-dimensional deformation matrix based at least in part on the plurality of one-dimensional deformation matrices.

In another aspect of the present disclosure, to generate one of the plurality of one-dimensional deformation matrices, the vehicle controller is further programmed to binarize one of the plurality of images to produce a binarized image. To generate one of the plurality of one-dimensional deformation matrices, the vehicle controller is further programmed to determine a plurality of deformation values for a plurality of points of the binarized image. To determine the plurality of deformation values, the binarized image is compared to a reference image. To generate one of the plurality of one-dimensional deformation matrices, the vehicle controller is further programmed to generate the one of the plurality of one-dimensional deformation matrices. Each of a plurality of elements of the one of the plurality of one-dimensional deformation matrices is one of the plurality of deformation values.

In another aspect of the present disclosure, the two-dimensional deformation matrix includes a plurality of rows and a plurality of columns. Each of the plurality of rows of the two-dimensional deformation matrix is one of the plurality of one-dimensional deformation matrices.

In another aspect of the present disclosure, to determine the severity of the deformation in the roadway surface, the vehicle controller is further programmed to identify a plurality of distressed elements of the two-dimensional deformation matrix. The deformation value of each of the plurality of distressed elements is greater than or equal to a predetermined deformation value threshold. To determine the severity of the deformation in the roadway surface, the vehicle controller is further programmed to determine a vertical distress value of the two-dimensional deformation matrix based at least in part on the plurality of distressed elements. To determine the severity of the deformation in the roadway surface, the vehicle controller is further programmed to determine a horizontal distress value of the two-dimensional deformation matrix based at least in part on the plurality of distressed elements. To determine the severity of the deformation in the roadway surface, the vehicle controller is further programmed to determine an average depth of the deformation based at least in part on the plurality of deformation values of the two-dimensional deformation matrix. To determine the severity of the deformation in the roadway surface, the vehicle controller is further programmed to determine at least one vehicle characteristic. To determine the severity of the deformation in the roadway surface, the vehicle controller is further programmed to determine the severity of the deformation in the roadway surface based at least in part on the vertical distress value, the horizontal distress value, the average depth, a quantity of the plurality of distressed elements, and the at least one vehicle characteristic.

In another aspect of the present disclosure, to determine the vertical distress value, the vehicle controller is further programmed to determine a quantity of the plurality of distressed elements in each column of the two-dimensional deformation matrix. To determine the vertical distress value, the vehicle controller is further programmed to calculate the vertical distress value of the two-dimensional deformation matrix using a formula:

$$V_D = \sum_{i=1}^{N_C-1} |Q_C[i+1] - Q_C[i]|$$

where $V_D$ is the vertical distress value, $N_C$ is a total number of columns in the two-dimensional deformation matrix, and $Q_C[i]$ is the quantity of the plurality of distressed elements in an ith column of the two-dimensional deformation matrix.

In another aspect of the present disclosure, to determine the horizontal distress value, the vehicle controller is further programmed to determine a quantity of the plurality of distressed elements in each row of the two-dimensional deformation matrix. To determine the horizontal distress value, the vehicle controller is further programmed to calculate the horizontal distress value of the two-dimensional deformation matrix using a formula:

$$H_D = \sum_{i=1}^{N_R-1} |Q_R[i+1] - Q_R[i]|$$

where $H_D$ is the horizontal distress value, $N_R$ is a total number of rows in the two-dimensional deformation matrix, and $Q_R[i]$ is the quantity of the plurality of distressed elements in an ith row of the two-dimensional deformation matrix.

In another aspect of the present disclosure, the severity of the deformation in the roadway surface is determined using a machine learning algorithm configured to receive the vertical distress value, the horizontal distress value, the average depth, the quantity of the plurality of distressed elements, and the at least one vehicle characteristic as inputs and produce a deformation severity classification of the deformation as an output.

In another aspect of the present disclosure, the system further may include a global navigation satellite system (GNSS) in electrical communication with the vehicle controller and a vehicle communication system in electrical communication with the vehicle controller. The vehicle controller is further programmed to determine a location of the vehicle using the GNSS. The vehicle controller is further programmed to transmit the deformation severity classification of the deformation and the location of the vehicle to a remote server using the vehicle communication system. The vehicle controller is further programmed to retrieve a quantity of severe deformations in an environment surrounding the vehicle from the remote server using the vehicle communication system based at least in part on the location of the vehicle. The vehicle controller is further programmed to adjust a sampling rate of the system based at least in part on the quantity of severe deformations in the environment surrounding the vehicle.

In another aspect of the present disclosure, the display is an augmented reality head-up display (AR-HUD) system in electrical communication with the vehicle controller. The AR-HUD system includes an occupant position tracking device and an AR-HUD projector. To notify the occupant of the vehicle, the vehicle controller is further programmed to determine a position of the occupant of the vehicle using the occupant position tracking device. To notify the occupant of the vehicle, the vehicle controller is further programmed to calculate a size, shape, and location of a graphic based on the position of the occupant. To notify the occupant of the vehicle, the vehicle controller is further programmed to display the graphic corresponding to the severity of the deformation in the roadway surface on a windscreen of the vehicle using the AR-HUD system based on the size, shape, and location.

According to several aspects, a method for determining a condition of a roadway a vehicle is traveling on is provided. The method includes projecting a light beam onto a roadway surface using an illumination device. The method also includes capturing a plurality of images of the light beam on the roadway surface using a camera as the vehicle is in motion. The method also includes determining a severity of a deformation in the roadway surface based at least in part on the plurality of images of the light beam. The method also includes notifying an occupant of the vehicle using a display based at least in part on the severity of the deformation in the roadway surface.

In another aspect of the present disclosure, determining the severity of the deformation in the roadway surface further may include generating a plurality of one-dimensional deformation matrices based at least in part on the plurality of images. Determining the severity of the deformation in the roadway surface further may include generating a two-dimensional deformation matrix based at least in part on the plurality of one-dimensional deformation matrices. The two-dimensional deformation matrix includes a plurality of rows and a plurality of columns. Each of the plurality of rows of the two-dimensional deformation matrix is one of the plurality of one-dimensional deformation matrices.

In another aspect of the present disclosure, generating one of the plurality of one-dimensional deformation matrices further may include binarizing one of the plurality of images to produce a binarized image. Generating one of the plurality of one-dimensional deformation matrices further may include determining a plurality of deformation values for a plurality of points of the binarized image. To determine the plurality of deformation values, the binarized image is compared to a reference image. Generating one of the plurality of one-dimensional deformation matrices further may include generating the one of the plurality of one-dimensional deformation matrices. Each of a plurality of elements of the one of the plurality of one-dimensional deformation matrices is one of the plurality of deformation values.

In another aspect of the present disclosure, determining the severity of the deformation in the roadway surface further may include identifying a plurality of distressed elements of the two-dimensional deformation matrix. The deformation value of each of the plurality of distressed elements is greater than or equal to a predetermined deformation value threshold. Determining the severity of the deformation in the roadway surface further may include determining a vertical distress value and a horizontal distress value of the two-dimensional deformation matrix based at least in part on the plurality of distressed elements. Determining the severity of the deformation in the roadway surface further may include determining an average depth of the deformation based at least in part on the plurality of deformation values of the two-dimensional deformation matrix. Determining the severity of the deformation in the roadway surface further may include determining at least one vehicle characteristic. Determining the severity of the deformation in the roadway surface further may include determining the severity of the deformation in the roadway surface using a machine learning algorithm configured to receive the vertical distress value, the horizontal distress value, the average depth, a quantity of the plurality of distressed elements, and the at least one vehicle characteristic as inputs and produce a deformation severity classification of the deformation as an output.

In another aspect of the present disclosure, determining the vertical distress value and the horizontal distress value further may include determining a quantity of the plurality of distressed elements in each column of the two-dimensional deformation matrix. Determining the vertical distress value and the horizontal distress value further may include calculating the vertical distress value of the two-dimensional deformation matrix using a formula:

$$V_D = \sum_{i=1}^{N_C-1} |Q_C[i+1] - Q_C[i]|$$

where $V_D$ is the vertical distress value, $N_C$ is a total number of columns in the two-dimensional deformation matrix, and $Q_C[i]$ is the quantity of the plurality of distressed elements in an ith column of the two-dimensional deformation matrix. Determining the vertical distress value and the horizontal distress value further may include calculating the horizontal distress value of the two-dimensional deformation matrix using a formula:

$$H_D = \sum_{i=1}^{N_R-1} |Q_R[i+1] - Q_R[i]|$$

where $H_D$ is the horizontal distress value, $N_R$ is a total number of rows in the two-dimensional deformation matrix, and $Q_R[i]$ is the quantity of the plurality of distressed elements in an ith row of the two-dimensional deformation matrix.

In another aspect of the present disclosure, the method further includes determining a location of the vehicle using a global navigation satellite system (GNSS). The method further includes transmitting the deformation severity classification of the deformation and the location of the vehicle to a remote server using a vehicle communication system. The method further includes retrieving a quantity of severe deformations in an environment surrounding the vehicle from the remote server using the vehicle communication system based at least in part on the location of the vehicle. The method further includes adjusting a sampling rate of the method based at least in part on the quantity of severe deformations in the environment surrounding the vehicle.

In another aspect of the present disclosure, notifying the occupant of the vehicle further includes determining a position of the occupant of the vehicle using an occupant position tracking device. Notifying the occupant of the vehicle further includes calculating a size, shape, and location of a graphic based on the position of the occupant. Notifying the occupant of the vehicle further includes displaying the graphic corresponding to the severity of the deformation in the roadway surface on a windscreen of the vehicle using an augmented reality head up display (AR-HUD) system based on the size, shape, and location.

According to several aspects, a system for determining a condition of a roadway a vehicle is traveling on is provided. The system includes an illumination device configured to project a light beam onto a roadway surface. The system also includes a camera configured to capture an image of the light beam on the roadway surface. The system also includes an augmented reality head-up display (AR-HUD) system configured to provide information related to the condition of the roadway to an occupant of the vehicle. The system also includes a global navigation satellite system (GNSS) configured to determine a location of the vehicle. The system also includes a vehicle communication system configured to communicate with a remote server. The system also includes a vehicle controller in electrical communication with the illumination device, the camera, the AR-HUD system, the GNSS, and the vehicle communication system. The vehicle controller is programmed to repeatedly execute a plurality of instructions based at least in part on a sampling rate. The plurality of instructions includes determine a location of the vehicle using the GNSS. The plurality of instructions further includes retrieve a quantity of severe deformations in an environment surrounding the vehicle from the remote server using the vehicle communication system based at least in part on the location of the vehicle. The plurality of instructions further includes adjust the sampling rate based at least in part on the quantity of severe deformations in the environment surrounding the vehicle. The plurality of instructions further includes project the light beam onto the roadway surface using the illumination device. The plurality of instructions further includes capture a plurality of images of the light beam on the roadway surface using the camera as the vehicle is in motion. The plurality of instructions further includes determine a severity of a deformation in the roadway surface based at least in part on the plurality of images of the light beam. The plurality of instructions further includes notify the occupant of the vehicle using the AR-HUD system based at least in part on the severity of the deformation in the roadway surface.

In another aspect of the present disclosure, to determine the severity of the deformation in the roadway surface, the vehicle controller is further programmed to generate a plurality of one-dimensional deformation matrices based at least in part on the plurality of images. To generate one of the plurality of one-dimensional deformation matrices, the vehicle controller is further programmed to binarize one of the plurality of images to produce a binarized image. To generate one of the plurality of one-dimensional deformation matrices, the vehicle controller is further programmed to determine a plurality of deformation values for a plurality of points of the binarized image. To determine the plurality of deformation values, the binarized image is compared to a reference image. To generate one of the plurality of one-dimensional deformation matrices, the vehicle controller is further programmed to generate the one of the plurality of one-dimensional deformation matrices, where of a plurality of elements of the one of the plurality of one-dimensional deformation matrices is one of the plurality of deformation values. To determine the severity of the deformation in the roadway surface, the vehicle controller is further programmed to generate a two-dimensional deformation matrix based at least in part on the plurality of one-dimensional deformation matrices. The two-dimensional deformation matrix includes a plurality of rows and a plurality of columns. Each of the plurality of rows of the two-dimensional deformation matrix is one of the plurality of one-dimensional deformation matrices.

In another aspect of the present disclosure, to determine the severity of the deformation in the roadway surface, the vehicle controller is further programmed to identify a plurality of distressed elements of the two-dimensional deformation matrix. The deformation value of each of the plurality of distressed elements is greater than or equal to a predetermined deformation value threshold. To determine the severity of the deformation in the roadway surface, the vehicle controller is further programmed to determine a vertical distress value of the two-dimensional deformation matrix based at least in part on the plurality of distressed elements. To determine the severity of the deformation in the roadway surface, the vehicle controller is further programmed to determine a horizontal distress value of the two-dimensional deformation matrix based at least in part on the plurality of distressed elements. To determine the severity of the deformation in the roadway surface, the vehicle controller is further programmed to determine an average depth of the deformation based at least in part on the plurality of deformation values of the two-dimensional deformation matrix. To determine the severity of the deformation in the roadway surface, the vehicle controller is further programmed to determine at least one vehicle characteristic. To determine the severity of the deformation in the roadway surface, the vehicle controller is further programmed to determine the severity of the deformation in the roadway surface using a machine learning algorithm configured to receive the vertical distress value, the horizontal distress value, the average depth, the quantity of the plurality of distressed elements, and the at least one vehicle characteristic as inputs and produce a deformation severity classification of the deformation as an output.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

When driving and/or riding in a vehicle, occupants may encounter non-ideal roadway surfaces including deformations, such as, for example, potholes. Occupants may wish to avoid driving over deformations, however, it may be challenging to identify deformations and estimate their severity while the vehicle is in motion. Furthermore, deformations, such as potholes, may often fill with water, further increasing difficulty in assessing a shape, size, and depth of the deformation, especially in low-visibility conditions. Therefore, the present disclosure provides a system and method for determining a condition of a roadway a vehicle is traveling on, and more particularly, for identifying and classifying a severity of deformations in a roadway surface.

Figure 1:
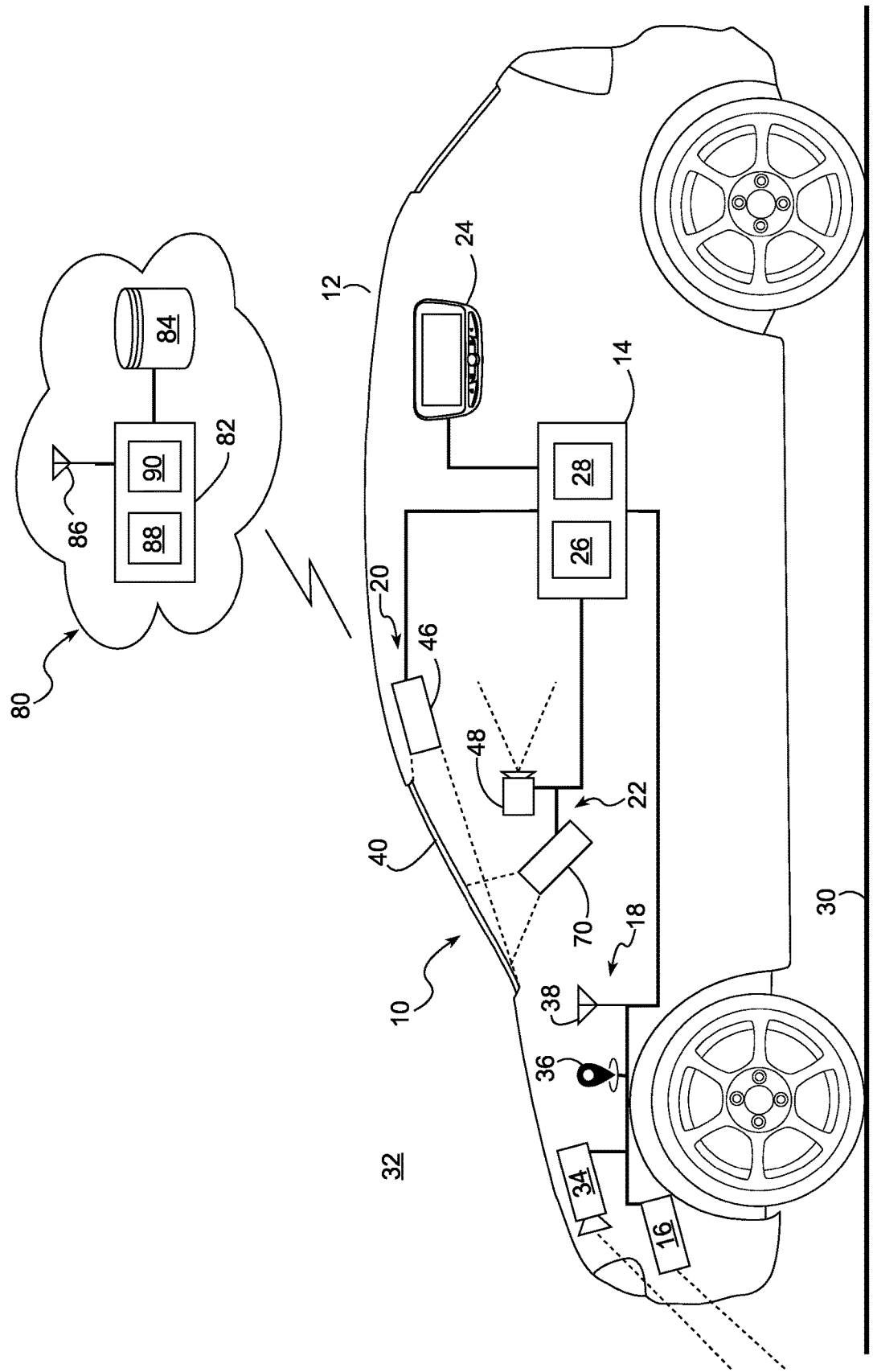
FIG. 1 is a schematic diagram of a system for determining a condition of a roadway a vehicle is traveling on, according to an exemplary embodiment.

Referring to FIG. 1, a system for determining a condition of a roadway a vehicle is traveling on is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a vehicle controller 14, an illumination device 16, a plurality of vehicle sensors 18, an augmented reality head-up display (AR-HUD) system 20, a transparent windscreen display (TWD) system 22, and a human-machine interface (HMI) 24.

The vehicle controller 14 is used to implement a method 500 for determining roadway condition for a vehicle, as will be described below. The vehicle controller 14 includes at least one processor 26 and a non-transitory computer readable storage device or media 28. The processor 26 may be a custom made or commercially available processor, a central processing unit (CPU), a graphics processing unit (GPU), an auxiliary processor among several processors associated with the vehicle controller 14, a semiconductor-based microprocessor (in the form of a microchip or chip set), a macroprocessor, a combination thereof, or generally a device for executing instructions. The computer readable storage device or media 28 may include volatile and non-volatile storage in read-only memory (ROM), random-access memory (RAM), and keep-alive memory (KAM), for example. KAM is a persistent or non-volatile memory that may be used to store various operating variables while the processor 26 is powered down. The computer-readable storage device or media 28 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the vehicle controller 14 to control various systems of the vehicle 12. The vehicle controller 14 may also consist of multiple controllers which are in electrical communication with each other. The vehicle controller 14 may be inter-connected with additional systems and/or controllers of the vehicle 12, allowing the vehicle controller 14 to access data such as, for example, speed, acceleration, braking, and steering angle of the vehicle 12.

The vehicle controller 14 is in electrical communication with the illumination device 16, the plurality of vehicle sensors 18, the AR-HUD system 20, the TWD system 22, and the HMI 24. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 14 are within the scope of the present disclosure.

The illumination device 16 is used to project a light beam onto a roadway surface 30 in front of the vehicle 12. The light beam is a line-shaped beam of light which is projected onto the roadway surface 30 in front of the vehicle 12. The light beam is projected such that it is oriented perpendicular to a direction of travel of the vehicle 12. When projected on a flat roadway surface, the light beam appears approximately linear (i.e., a straight line). However, when projected on an irregular roadway surface (e.g., a roadway surface with a deformation, such as, for example, a pothole), the light beam is distorted and does not appear as a straight line, as will be discussed in greater detail below. In an exemplary embodiment, the illumination device 16 is a laser line projector. In a non-limiting example, the laser line projector includes a laser diode, a collimating lens, and a line generating optic. The laser diode emits a highly concentrated beam of light which is collimated by the collimating lens. The collimated beam then passes through the line generating optic which diffracts the beam into a line. The illumination device 16 is in electrical communication with the vehicle controller 14 as discussed above.

The plurality of vehicle sensors 18 are used to receive information about an environment 32 surrounding the vehicle 12. In an exemplary embodiment, the plurality of vehicle sensors 18 include a camera 34, a global navigation satellite system (GNSS) 36, and a vehicle communication system 38. The plurality of vehicle sensors 18 are in electrical communication with the vehicle controller 14 as discussed above.

The camera 34 is used to capture images and/or videos of the environment 32 surrounding the vehicle 12. In an exemplary embodiment, the camera 34 is a photo and/or video camera which is positioned to view the environment 32 in front of the vehicle 12. In one example, the camera 34 is affixed inside of the vehicle 12, for example, in a headliner of the vehicle 12, having a view through a windscreen 40 of the vehicle 12. In another example, the camera 34 is affixed outside of the vehicle 12, for example, on a roof of the vehicle 12, having a view of the environment 32 in front of the vehicle 12. In yet another example, the camera 34 is affixed to a front bumper of the vehicle 12. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The GNSS 36 is used to determine a geographical location of the vehicle 12. In an exemplary embodiment, the GNSS 36 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS 36 additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS 36. It should be understood that various additional types of satellite-based radionavigation systems, such as, for example, the Global Positioning System (GPS), Galileo, GLONASS, and the BeiDou Navigation Satellite System (BDS) are within the scope of the present disclosure. It should be understood that the GNSS 36 may be integrated with the vehicle controller 14 (e.g., on a same circuit board with the vehicle controller 14 or otherwise a part of the vehicle controller 14) without departing from the scope of the present disclosure.

The vehicle communication system 38 is used by the vehicle controller 14 to communicate with other systems external to the vehicle 12. For example, the vehicle communication system 38 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 38 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 38 may further include an embedded universal integrated circuit card (eUICC) configured to store at least one cellular connectivity configuration profile, for example, an embedded subscriber identity module (eSIM) profile. The vehicle communication system 38 is further configured to communicate via a personal area network (e.g., BLUETOOTH) and/or near-field communication (NFC). However, additional or alternate communication methods, such as a dedicated short-range communications (DSRC) channel and/or mobile telecommunications protocols based on the $3^{rd}$ Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 38 may include one or more antennas and/or communication transceivers for receiving and/or transmitting signals, such as cooperative sensing messages (CSMs). The vehicle communication system 38 is configured to wirelessly communicate information between the vehicle 12 and another vehicle. Further, the vehicle communication system 38 is configured to wirelessly communicate information between the vehicle 12 and infrastructure or other vehicles. It should be understood that the vehicle communication system 38 may be integrated with the vehicle controller 14 (e.g., on a same circuit board with the vehicle controller 14 or otherwise a part of the vehicle controller 14) without departing from the scope of the present disclosure.

Figure 2:
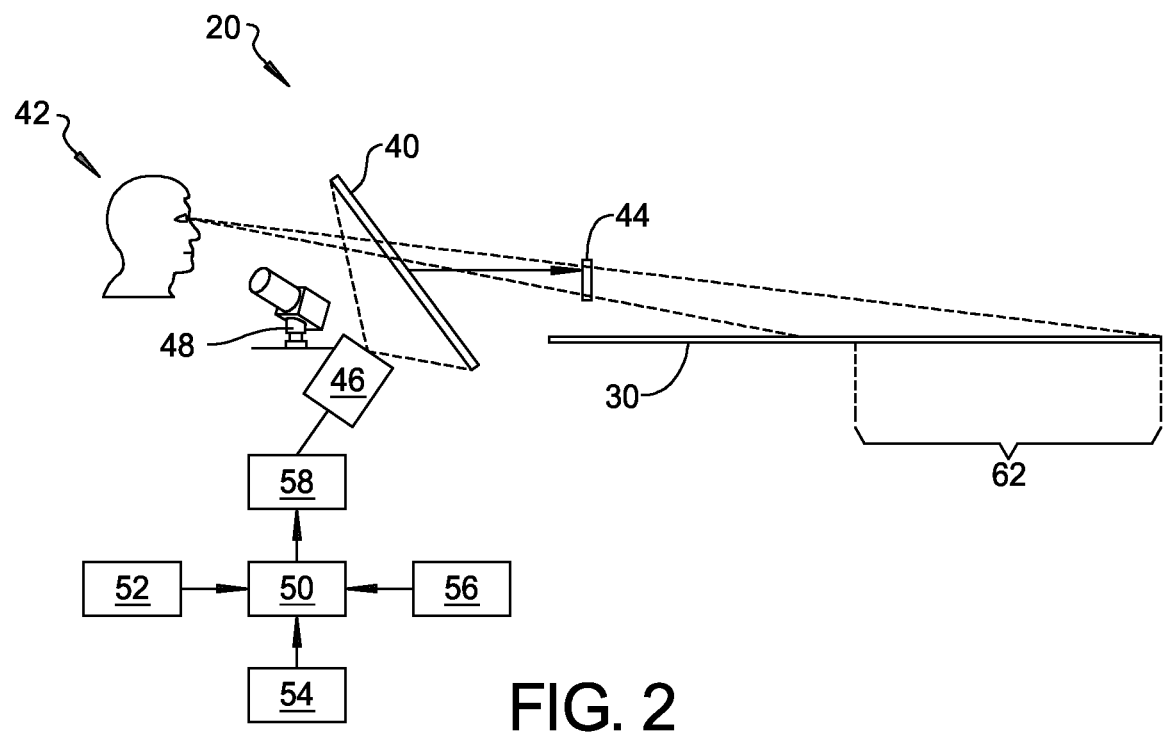
FIG. 2 is a schematic diagram of an AR-HUD system for use by an exemplary driver, according to an exemplary embodiment.

Referring to FIG. 2, a system diagram of the AR-HUD system 20 for use by an exemplary occupant 42 is shown. The AR-HUD system 20 is used to display AR-HUD graphics 44 (i.e., notification symbols providing visual information to the occupant 42) on the windscreen 40 of the vehicle 12. The AR-HUD system 20 includes an AR-HUD projector 46 and an occupant position tracking device 48. The AR-HUD system 20 is in electrical communication with the vehicle controller 14 as discussed above.

The AR-HUD projector 46 is used to project the AR-HUD graphics 44 on the windscreen 40 of the vehicle 12. It should be understood that various devices designed to project images including, for example, optical collimators, laser projectors, digital light projectors (DLP), and the like are within the scope of the present disclosure.

The occupant position tracking device 48 is used to determine a position of an occupant 42 in the vehicle 12. For example, the occupant position tracking device 48 may track a position of a head or eyes of the occupant 42. The position of the occupant 42 in the vehicle 12 from the occupant position tracking device 48 is used to locate the AR-HUD graphic 44 on the windscreen 40 of the vehicle 12. In an exemplary embodiment, the occupant position tracking device 48 is one or more cameras disposed in the vehicle 12.

To operate the AR-HUD system 20, the vehicle controller 14 includes multiple software modules, including a system manager 50. During operation of the system 10, the system manager 50 receives at least a first input 52, a second input 54, and a third input 56. The first input 52 is indicative of the location of the vehicle 12 in space (i.e., the geographical location of the vehicle 12), the second input 54 is indicative of the vehicle occupant 42 position in the vehicle 12 (e.g., the position of the eyes and/or head of the occupant 42 in the vehicle 12), and the third input 56 is data pertaining to a deformation in the roadway surface 30 in the environment 32 surrounding the vehicle 12, as will be discussed in greater detail below. The first input 52 may include data such as GNSS data (e.g., GPS data), vehicle speed, roadway curvature, and vehicle steering, and this data is collected from the plurality of vehicle sensors 18. The second input 54 is received from the occupant position tracking device 48. The third input 56 is data pertaining to the deformation in the roadway surface 30 in the environment 32 surrounding the vehicle 12, as will be discussed in greater detail below. The system manager 50 is configured to determine (e.g., compute) the type, size, shape, and color of the AR-HUD graphics 44 to be displayed using the AR-HUD projector 46 based on the first input 52 (i.e., the vehicle location in the environment 32), the second input 54 (e.g., the position of the eyes and/or head of the occupant 42 in the vehicle 12), and the third input 56 (i.e. the data pertaining to the deformation in the roadway surface 30 in the environment 32 surrounding the vehicle 12) The system manager 50 instructs an image engine 58, which is a software module or an integrated circuit of the AR-HUD projector 46 or the vehicle controller 14, to display the AR-HUD graphic 44 using the AR-HUD projector 46. The image engine 58 displays the AR-HUD graphic 44 on the windscreen 40 of the vehicle 12 using the AR-HUD projector 46 based on the type, size, shape, and color of the AR-HUD graphic 44 determined by the system manager 50. The AR-HUD graphic 44 is projected on the windscreen 40 by the AR-HUD projector 46 to show the AR-HUD graphic 44 along the roadway surface 30.

Figure 3:
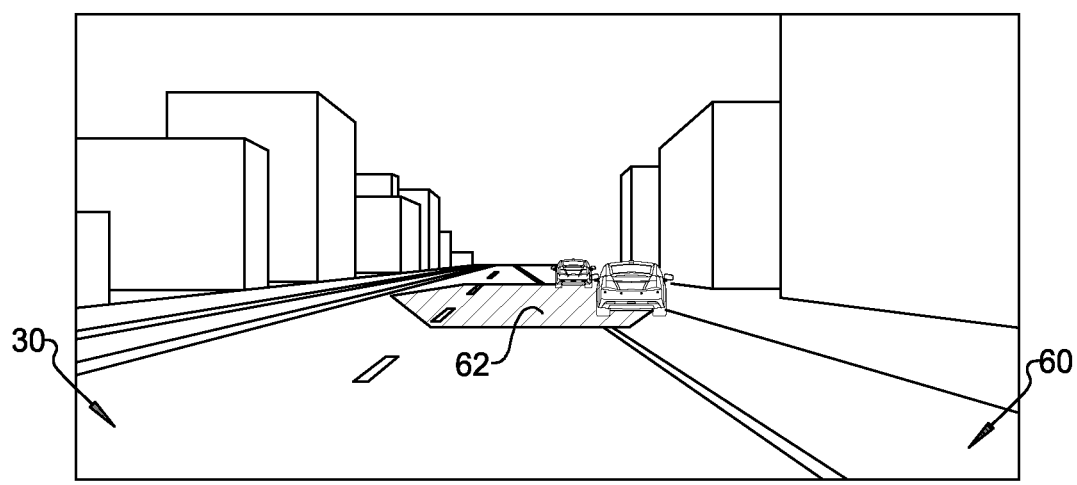
FIG. 3 is a schematic front view of a dual-focal plane augmented reality display, highlighting a second image plane of the dual-focal plane augmented reality display, according to an exemplary embodiment.
Figure 4:
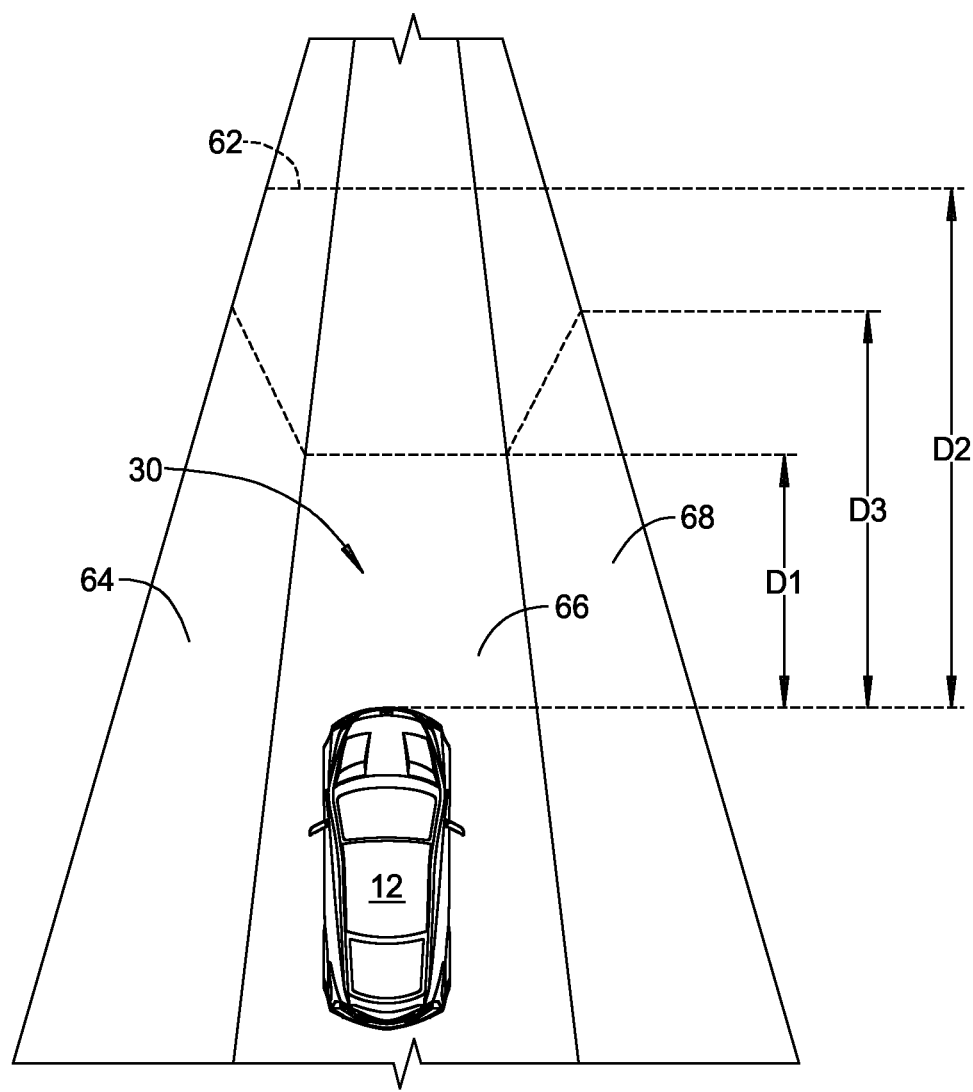
FIG. 4 is a schematic diagram of the second image plane of the dual-focal plane augmented reality display according to an exemplary embodiment.

In the exemplary embodiment of the present disclosure, the AR-HUD system 20 is a dual-focal plane AR-HUD system. With reference to FIGS. 3 and 4 and with continued reference to FIG. 2, the AR-HUD system 20 has a first image plane 60 and a second image plane 62. The first image plane 60 shows the view of the outside world, and the second image plane 62 is reserved for displaying the AR-HUD graphics 44. The TWD system 22 provides a third plane for graphics display, as will be discussed in greater detail below. The second image plane 62 spans multiple lanes and the AR-HUD graphics 44 appear at a location farther on a roadway surface 30 relative to the first image plane 60. For instance, as shown in FIGS. 3 and 4, the second image plane 62 covers a left lane 64, a central lane 66, and a right lane 68. As a non-limiting example, in the central lane 66, the second image plane 62 starts at a first predetermined distance D1 (e.g., twenty-five meters) from the vehicle 12 and ends at a second predetermined distance D2 (e.g., ninety meters) from the vehicle 12. Regardless of the specific distances, the second predetermined distance D2 is greater than the first predetermined distance D1 to help the occupant 42 see the AR-HUD graphics 44 displayed using the AR-HUD projector 46. In the left lane 64 and the right lane 68, the second image plane 62 is delimited by a sloped boundary that starts at the first predetermined distance D1 from the vehicle 12 and ends at a third predetermined distance D3 (e.g., fifty meters) from the vehicle 12. The third predetermined distance D3 is greater than the first predetermined distance D1 and less than the second predetermined distance D2 to help the occupant 42 see the AR-HUD graphics 44 displayed using the AR-HUD projector 46. As used herein, the term "dual-focal plane AR-HUD" means an AR-HUD system that presents images in a first image plane and a second image plane, wherein the first image plane and the second image plane are at different locations. It is desirable to configure the AR-HUD system 20 as a dual-focal plane AR-HUD to facilitate manipulation of the AR-HUD graphics 44 on the view of the outside word. For instance, by using a dual-focal plane AR-HUD, the size, location, and characteristics of the AR-HUD graphics 44 may be changed based on, for example, the location of the eyes of the occupant 42.

The TWD system 22 is used to display images on the windscreen 40 of the vehicle 12. In an exemplary embodiment, the AR-HUD system 20 can display the AR-HUD graphics 44 in a predefined region of the windscreen 40 (e.g., in the first image plane 60 and the second image plane 62). The TWD system 22 can display TWD graphics (not shown) in any region of the windscreen 40. Therefore, by operating the AR-HUD system 20 and the TWD system 22 in conjunction, the vehicle controller 14 may display graphics in any region of the windscreen 40. In an exemplary embodiment, the TWD system 22 includes transparent phosphors (not shown) embedded into the windscreen 40 and a TWD projector 70 (FIG. 1). The TWD system 22 is in electrical communication with the vehicle controller 14 as discussed above.

The transparent phosphors are light emitting particles which fluoresce in response to being excited by the TWD projector 70. In an exemplary embodiment, the transparent phosphors are red, green, and blue (RGB) phosphors, allowing full color operation of the TWD system 22. The use of monochrome and/or two-color phosphors is also within the scope of the present disclosure. When excitation light is absorbed by the transparent phosphors, visible light is emitted by the transparent phosphors. The excitation light may be, for example, violet light in the visible spectrum (ranging from about 380 to 450 nanometers) and/or ultraviolet light.

The TWD projector 70 is used to excite the transparent phosphors in a predetermined pattern to produce the TWD graphics on the windscreen 40. In an exemplary embodiment, the TWD projector 70 is a violet/ultraviolet laser projector disposed proximally to the headliner of the vehicle 12. The TWD projector 70 includes three lasers, each laser configured to excite one of the red, green, or blue transparent phosphors.

In an exemplary embodiment, the HMI 24 is used in addition to the AR-HUD system 20 and the TWD system 22 to display information about the deformation in the roadway surface in the environment 32 surrounding the vehicle 12. In another exemplary embodiment, the HMI 24 is used instead of the AR-HUD system 20 and/or the TWD system 22 to display information about the deformation in the roadway surface in the environment 32 surrounding the vehicle 12. In the aforementioned exemplary embodiments, the HMI 24 is a display system located in view of the occupant 42 and capable of displaying text, graphics, and/or images. It is to be understood that HMI display systems including LCD displays, LED displays, and the like are within the scope of the present disclosure. Further exemplary embodiments where the HMI 24 is disposed in a rearview mirror are also within the scope of the present disclosure. The HMI 24 is in electrical communication with the vehicle controller 14 as discussed above.

With continued reference to FIG. 1, a server system is illustrated and generally indicated by reference number 80. The server system 80 includes a server controller 82 in electrical communication with a database 84 and a server communication system 86. In a non-limiting example, the server system 80 is located in a server farm, datacenter, or the like, and connected to the internet. The server controller 82 includes at least one server processor 88 and a server non-transitory computer readable storage device or server media 90. The description of the type and configuration given above for the vehicle controller 14 also applies to the server controller 82. The description given above for the vehicle communication system 38 also applies to the server communication system 86. The server communication system 86 is used to communicate with external systems, such as, for example, the vehicle controller 14 via the vehicle communication system 38.

Figure 5:
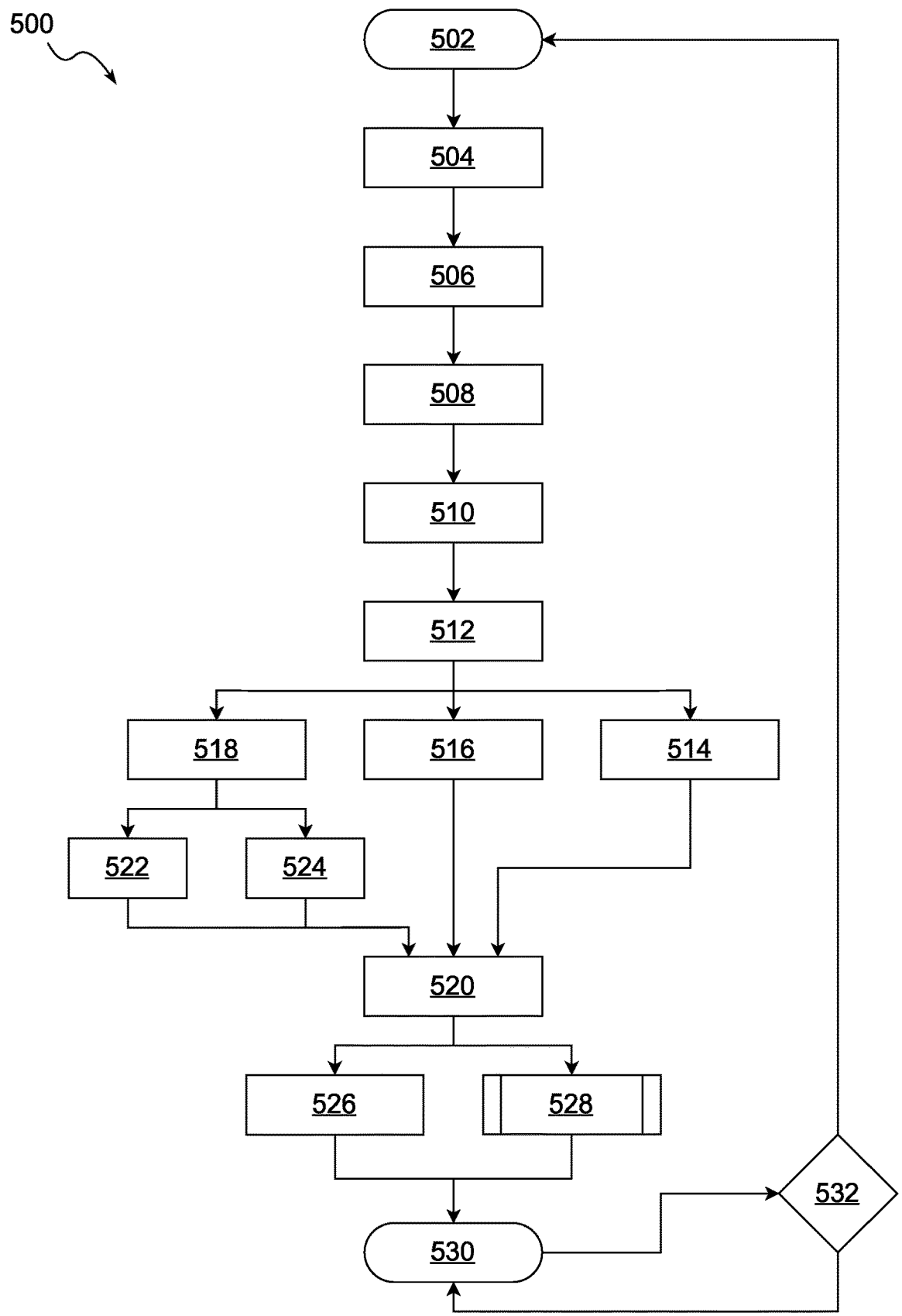
FIG. 5 is a flowchart of a method for determining a condition of a roadway a vehicle is traveling on, according to an exemplary embodiment.

Referring to FIG. 5, a flowchart of the method 500 is shown. The method 500 begins at block 502 and proceeds to block 504. At block 504, the vehicle controller 14 uses the illumination device 16 to project the light beam onto the roadway surface 30. As discussed above, the light beam is a line-shaped laser beam which is oriented perpendicular to a direction of travel of the vehicle 12. Therefore, as the vehicle 12 moves forward, the light beam "scans" along the roadway surface 30 in front of the vehicle 12. After block 504, the method 500 proceeds to block 506.

At block 506, the vehicle controller 14 uses the camera 34 to capture a plurality of images of the light beam projected at block 504 on the roadway surface 30. In an exemplary embodiment, the vehicle 12 is in motion, such that each of the plurality of images contains the light beam projecting on a different portion of the roadway surface 30. After block 506, the method 500 proceeds to block 508.

At block 508, the vehicle controller 14 isolates a measured light beam from each of the plurality of images captured at block 506. In an exemplary embodiment, to isolate the measured light beam, the vehicle controller 14 binarizes each of the plurality of images to produce a plurality of binarized images. In a non-limiting example, to binarize each of the plurality of images, the vehicle controller 14 first converts the color image data into grayscale image data using a color space conversion algorithm (i.e., RGB to grayscale conversion). Next, a threshold value is determined. In a non-limiting example, the threshold value is determined using a thresholding algorithm (e.g., Otsu's method). The threshold value is then applied to the grayscale image data to convert it into binary image data. All pixel values above the threshold are set to white (1) and all pixel values below the threshold are set to black (0). Therefore, by binarizing the each of the plurality of images, data pertaining to a shape of the measured light beam is isolated from unneeded background data. It should be understood that additional image preprocessing techniques, such as, for example, image denoising, are within the scope of the present disclosure. After block 508, the method 500 proceeds to block 510.

Figure 6:
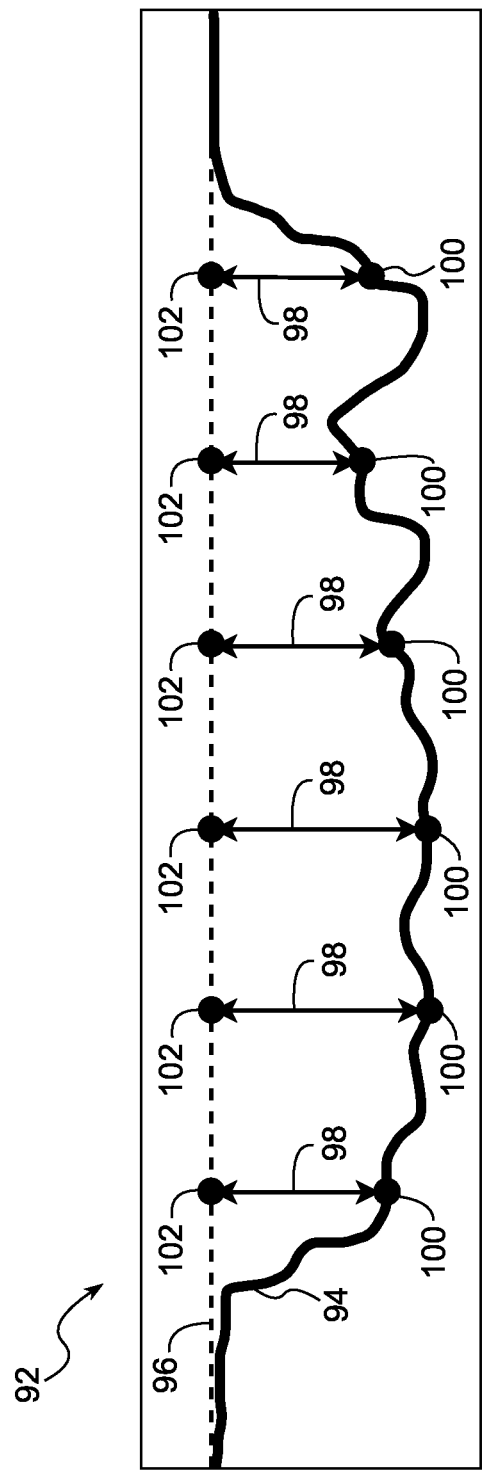
FIG. 6 is a composite image including a measured light beam overlayed on a reference light beam, according to an exemplary embodiment.

Referring to FIG. 6 and with continued reference to FIG. 5, a composite image 92 including a measured light beam 94 overlayed on a reference light beam 96 is shown. In an exemplary embodiment, the reference light beam 96 is generated from an image of a light beam which is projected on a flat roadway surface 30. In the composite image 92, the reference light beam 96 is shown as a dashed line for clarity. At block 510, the vehicle controller 14 determines a plurality of deformation values 98 for each of a plurality of points 100 of each of the plurality of measured light beams 94 isolated at block 508. In the scope of the present disclosure, the deformation value 98 quantifies how much the measured light beam 94 deviates from the reference light beam 96.

In an exemplary embodiment, to determine the plurality of deformation values 98 for the measured light beam 94, the plurality of points 100 are first determined. In the composite image 92, the plurality of points 98 includes six points for the sake of clarity. It should be understood that the plurality of points 98 may include more or less points without departing from the scope of the present disclosure. Next, relevant features are extracted from the measured light beam 94 and the reference light beam 96. In a non-limiting example, relevant features include features which capture a shape and/or orientation of the measured light beam 94 and the reference light beam 96. For example, edge detection algorithms are used to identify edges of the measured light beam 94 and the reference light beam 96.

Once relevant features have been extracted, the measured light beam 94 and the reference light beam 96 are compared to determine the deformation values 98. In a non-limiting example, a matching algorithm (e.g., a scale-invariant feature transform algorithm) is used to compare the relevant features of the measured light beam 94 and the reference light beam 96 and identify a plurality of reference points 102 on the reference light beam 96, wherein each of the plurality of reference points 102 corresponds to one of the plurality of points 100 on the measured light beam 94. The plurality of deformation values 98 are then determined based on a distance (e.g., a number of pixels) between each of the plurality of points 100 and a corresponding one of the plurality of reference points 102. The plurality of deformation values 98 for each of the plurality of measured light beams 94 isolated at block 508 are stored in a plurality of one-dimensional deformation matrices, wherein each of the plurality of one-dimensional deformation matrices includes the plurality of deformation values 98 corresponding to one of the plurality of measured light beams 94. After block 510, the method 500 proceeds to block 512.

At block 512, the vehicle controller 14 generates the two-dimensional deformation matrix 200 based on the plurality of one-dimensional deformation matrices generated at block 510. In an exemplary embodiment, the two-dimensional deformation matrix 200 is a concatenation of each of the plurality of one-dimensional deformation matrices. In other words, each of a plurality of rows of the two-dimensional deformation matrix 200 is one of the plurality of one-dimensional deformation matrices. Therefore, the two-dimensional deformation matrix 200 contains a plurality of elements, each of the plurality of elements having a deformation value. After block 512, the method 500 proceeds to blocks 514, 516, and 518.

At block 514, the vehicle controller 14 determines at least one vehicle characteristic of the vehicle 12. In the scope of the present disclosure, the at least one vehicle characteristic is a characteristic of the vehicle 12 which is related to an ability of the vehicle 12 to traverse the deformation in the roadway surface 30 safely and without damage to the vehicle 12. In a non-limiting example, the at least one vehicle characteristic includes at least one of a ground clearance of the vehicle 12, a tire size of the vehicle 12, suspension characteristics (e.g., suspension stiffness, suspension articulation capability, and/or the like) of the vehicle 12, and/or the like. It should be understood that various additional characteristics which are related to the ability of the vehicle 12 to traverse the deformation in the roadway surface 30 are within the scope of the present disclosure. In an exemplary embodiment, the at least one vehicle characteristic is predetermined and stored in the media 28 of the vehicle controller 14. In another exemplary embodiment, the vehicle controller 14 uses the vehicle communication system 38 to retrieve the at least one vehicle characteristic from a remote system (e.g., the server system 80). After block 514, the method 500 proceeds to block 520, as will be discussed below.

At block 516, the vehicle controller 14 determines an average depth of the deformation in the roadway surface 30 based at least in part on the two-dimensional deformation matrix 200. In a non-limiting example, the average depth of the deformation in the roadway surface 30 is determined based on a largest deformation value in the two-dimensional deformation matrix 200. It should be understood that higher precision methods of quantifying a depth of the deformation in the roadway surface 30 are within the scope of the present disclosure. For example, the two-dimensional deformation matrix 200 may be divided into a plurality of sections, and a depth may be calculated for each of the plurality of sections to provide a quantification of depth in various regions of the deformation in the roadway surface 30.

Figure 7A:
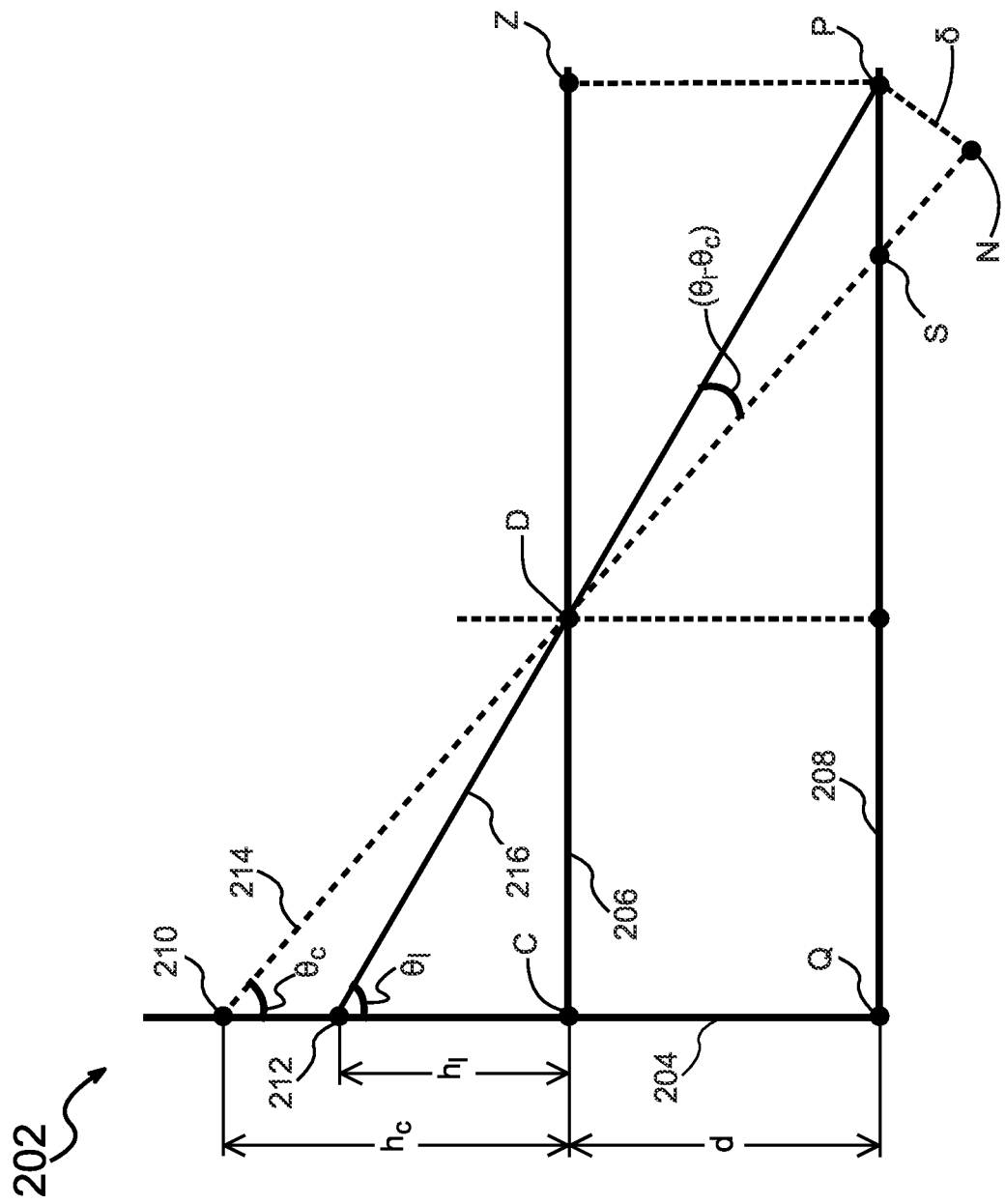
FIG. 7A is a first diagram of a depth measurement for an air-filled deformation, according to an exemplary embodiment.

Referring to FIG. 7A, a first diagram 202 of an exemplary depth measurement for an air-filled deformation is shown. In the first diagram 202, the vertical axis 204 represents height. The first horizontal axis 206 defined between points C and Z represents the height of a nominal roadway surface 30. The second horizontal axis 208 defined between points Q and P represents the height of a bottom surface of a deformation in the roadway surface 30 having a depth d. The camera 34 is positioned at point 210 at a height of $h_C$ above the first horizontal axis 206. The illumination device 16 is positioned at point 212 at a height of hi above the first horizontal axis 206. The dashed line 214 represents a line-of-sight of the camera 34. The solid line 216 represents a path of the light beam projected by the illumination device 16. Assuming no deformation in the roadway surface 30, the line-of-sight 214 of the camera 34 intersects with the path 216 of the light beam at the roadway surface 30 (i.e., at point D). Assuming a deformation in the roadway surface 30, the line-of-sight 214 of the camera 34 continues past point D and intersects the second horizontal axis 208 (i.e., the bottom of the deformation in the roadway surface 30) at point S. The path 216 of the light beam continues past point D and intersects the second horizontal axis 208 (i.e., the bottom of the deformation in the roadway surface 30) at point P. The deformation value as determined at block 510 is referred to as δ, and is defined between points P and N.

In a first exemplary embodiment, to determine a depth measurement based on a deformation value, the following formula may be used:

$$d = \delta \frac{\cos(\theta_I)}{\sin(\theta_I - \theta_c)} \quad (1)$$

wherein δ is the deformation value, $\theta_I$ is an angle of inclination of the illumination device 16, and $\theta_C$ is an angle of inclination of the camera 34. Formula 1 assumes that the refractive index of a substance filling the deformation in the roadway surface 30 is very close to one. In other words, formula 1 assumes that the deformation in the roadway surface 30 is filled with air, which has a refractive index of nearly one. In practice, the deformation in the roadway surface 30 may be filled with materials having a higher refractive index, such as, for example, water, as will be discussed below.

Figure 7B:
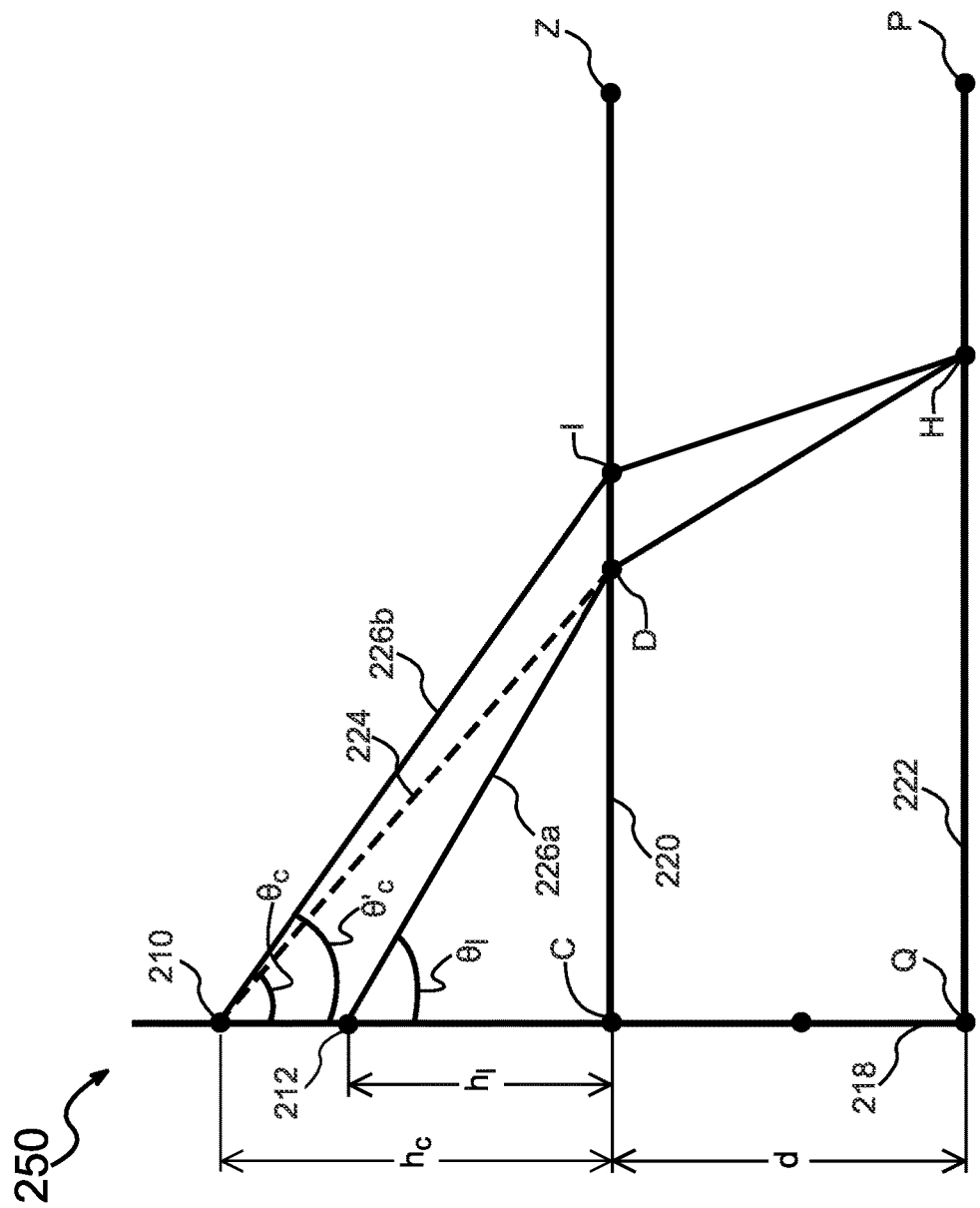
FIG. 7B is a second diagram of a depth measurement for a water-filled deformation, according to an exemplary embodiment.

Referring to FIG. 7B, a second diagram 250 of an exemplary depth measurement for a water-filled deformation is shown. In the second diagram 250, the vertical axis 218 represents height. The first horizontal axis 220 defined between points C and Z represents the height of a nominal roadway surface 30. The second horizontal axis 222 defined between points Q and P represents the height of a bottom surface of a water-filled deformation in the roadway surface 30 having a depth d. The camera 34 is positioned at point 210 at a height of $h_C$ above the first horizontal axis 220. The illumination device 16 is positioned at point 212 at a height of hi above the first horizontal axis 220. The dashed line 224 represents a line-of-sight of the camera 34. The solid line 226a represents a path of the light beam projected by the illumination device 16. The solid line 226b represents a path of a reflection of the light beam projected by the illumination device 16 back to the camera 34. The path 226a of the light beam intersects with the surface of the water in the water-filled deformation at point D. After being refracted by the water in the water-filled deformation, the path 226a reflects off the bottom surface 222 of the water-filled deformation at point H. The path of the reflection 226b of the light beam exits the surface of the water in the water-filled deformation at point I and is again refracted by the water before being received by the camera 34 at point 210.

In a second exemplary embodiment, to determine a depth measurement based on a deformation value, the following formulas may be used:

$$d = \frac{1}{\eta^2}\left[\frac{\delta'}{\cos\left(\theta_C\left(\sqrt{\frac{w-\eta^2}{\eta^2-1}} - \tan\theta_C\right)\right)} - h_C\right]w^{\frac{3}{2}} \quad (2)$$

$$a_1 w^4 + b_1 w^3 + c_1 w^2 + d_1 w + e_1 = 0 \quad (3)$$

$$w = \eta^2 + (\eta^2 - 1)(\tan\theta'_C)^2 \quad (4)$$

$$a_1 = h_C^4 \quad (5)$$

$$b_1 = 2h_C^2 d^2 - 2h_C^4 \eta^2 - 2a^2 h_C^2(\eta^2 - 1) - 4h_C^2 d^2 \quad (6)$$

$$c_1 = a^4(\eta^2-1)^2 + 2h_C^4\eta^4 + d^4 - 2a^2(\eta^2-1)d^2 + 2a^2 h_C^2(\eta^2-1)\eta^2 + 6h_C^2 d^2 \eta^2 \quad (7)$$

$$d_1 = 2a^2(\eta^2-1)d^2\eta^2 - 2d^4\eta^2 - 2h_C^2 d^2\eta^4 \quad (8)$$

$$e_1 = d^4\eta^4 \quad (9)$$

wherein δ' is the deformation value determined at block 510, $\theta_I$ is the angle of inclination of the illumination device 16, $\theta_C$ is the angle of inclination of the camera 34, $\theta_C'$ is an angle of incidence of a reflection of the light beam projected by the illumination device 16 received by the camera 34, and η is a refractive index of the water in the filling the water-filled deformation (e.g., water, having η≈1.333). It should be understood that a similar method may be used to determine a depth of deformations filled with other refractive substances within the scope of the present disclosure.

In a third exemplary embodiment, to determine a depth measurement based on a deformation value, a machine learning algorithm is used. In an exemplary embodiment, the machine learning algorithm is a computer-vision algorithm which has been trained to determine the depth measurement based on the deformation value. In a non-limiting example, the machine learning algorithm is trained by providing the algorithm with a plurality of deformation values for which the depth measurement has been predetermined. After sufficient training of the machine learning algorithm, the algorithm can identify a depth measurement based on a deformation value with a high accuracy and precision. Referring again to FIG. 5, after block 516, the method 500 proceeds to block 520, as will be discussed below.

At block 518, the vehicle controller 14 identifies a plurality of distressed elements of the two-dimensional deformation matrix generated at block 512. In the scope of the present disclosure, a distressed element is an element of the two-dimensional deformation matrix having a deformation value greater than or equal to a predetermined deformation value threshold (e.g., three pixels). Therefore, at block 518, each element of the two-dimensional deformation matrix is compared to the predetermined deformation value threshold. If the deformation value of a given element is greater than or equal to the predetermined deformation value threshold, the given element is determined to be a distressed element. If the deformation value of a given element is less than the predetermined deformation value threshold, the given element is determined to be a non-distressed element. After block 518, the method 500 proceeds to blocks 522 and 524.

At block 522, the vehicle controller 14 determines a vertical distress value of the two-dimensional deformation matrix. In the scope of the present disclosure, the vertical distress value of the two-dimensional deformation matrix is an accumulation of differences between quantities of distressed elements in adjacent columns of the two-dimensional deformation matrix. In an exemplary embodiment, to determine the vertical distress value, the vehicle controller 14 first determines a quantity of the plurality of distressed elements in each column of the two-dimensional deformation matrix. Then, the following formula is used to calculate the vertical distress value:

$$V_D = \sum_{i=1}^{N_C-1} |Q_C[i+1] - Q_C[i]|$$

wherein $V_D$ is the vertical distress value, $N_C$ is a total number of columns in the two-dimensional deformation matrix, and $Q_C[i]$ is the quantity of the plurality of distressed elements in an ith column of the two-dimensional deformation matrix. After block 522, the method 500 proceeds to block 520, as will be discussed below.

At block 524, the vehicle controller 14 determines a horizontal distress value of the two-dimensional deformation matrix. In the scope of the present disclosure, the horizontal distress value of the two-dimensional deformation matrix is an accumulation of differences between quantities of distressed elements in adjacent rows of the two-dimensional deformation matrix. In an exemplary embodiment, to determine the horizontal distress value, the vehicle controller 14 first determines a quantity of the plurality of distressed elements in each row of the two-dimensional deformation matrix. Then, the following formula is used to calculate the horizontal distress value:

$$H_D = \sum_{i=1}^{N_R-1} |Q_R[i+1] - Q_R[i]|$$

wherein $H_D$ is the horizontal distress value, $N_R$ is a total number of rows in the two-dimensional deformation matrix, and $Q_R[i]$ is the quantity of the plurality of distressed elements in an ith row of the two-dimensional deformation matrix. After block 522, the method 500 proceeds to block 520.

At block 520, the vehicle controller 14 determines a severity of the deformation in the roadway surface 30 based on the at least one vehicle characteristic determined at block 514, the average depth of the deformation determined at block 516, the vertical distress value determined at block 522 and the horizontal distress value determined at block 524. In an exemplary embodiment, the vehicle controller 14 determines a deformation severity classification (e.g., low severity, medium severity, high severity, and the like) of the deformation in the roadway surface 30 using a machine learning algorithm.

In a non-limiting example, the machine learning algorithm includes multiple layers, including an input layer and an output layer, as well as one or more hidden layers. The input layer receives the at least one vehicle characteristic determined at block 514, the average depth of the deformation determined at block 516, the vertical distress value determined at block 522 and the horizontal distress value determined at block 524 as inputs. The inputs are then passed on to the hidden layers. Each hidden layer applies a transformation (e.g., a non-linear transformation) to the data and passes the result to the next hidden layer until the final hidden layer. The output layer produces the final predicted classification.

To train the machine learning algorithm, a dataset of inputs and their corresponding deformation severity classifications is used. The algorithm is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained model is then used to classify new input data.

After sufficient training of the machine learning algorithm, the algorithm is capable of accurately and precisely determining deformation severity classifications based on the at least one vehicle characteristic determined at block 514, the average depth of the deformation determined at block 516, the vertical distress value determined at block 522 and the horizontal distress value determined at block 524. By adjusting the weights between the nodes in each hidden layer during training, the algorithm "learns" to recognize patterns in the data that are indicative of different deformation severity classifications. After block 520, the method 500 proceeds to blocks 526 and 528.

At block 526, the vehicle controller 14 notifies the occupant 42 of the vehicle 12. In a first exemplary embodiment, the occupant 42 is notified using the AR-HUD system 20. As discussed above in reference to FIG. 2, the AR-HUD system 20 calculates a size, shape, and location of the graphic based on data from the vehicle sensors 18 and the occupant position tracking device 48. In a non-limiting example, the AR-HUD graphic 44 includes a polygon (e.g., a square, circle, octagon, or the like) displayed such that the shape is overlayed on the deformation in the roadway surface 30 from the perspective of the occupant 42, thus increasing occupant awareness of the deformation in the roadway surface 30. The polygon may be colored based on the deformation severity classification (e.g., green for low severity, yellow for medium severity, and red for high severity) to provide further information to the occupant 42.

In a second exemplary embodiment, the occupant 42 is notified using the TWD system 22. In a non-limiting example, the TWD system 22 is used to display the TWD graphic as discussed above.

In a third exemplary embodiment, the occupant 42 is notified using the HMI 24. In a non-limiting example, a notification is displayed using the HMI 24 to increase occupant awareness of the deformation in the roadway surface 30. It should be understood that various additional notifications, such as, for example, audible notifications (e.g., a chime produced by a speaker of the vehicle 12), haptic notifications (e.g., a vibration produced by a haptic seat of the vehicle 12), and/or the like are within the scope of the present disclosure.

It should be understood that any of the first, second, and third embodiments may be performed concurrently or separately in order to notify the occupant 42 in the scope of the present disclosure. After block 526, the method 500 proceeds to enter a standby state at block 530.

Figure 8:
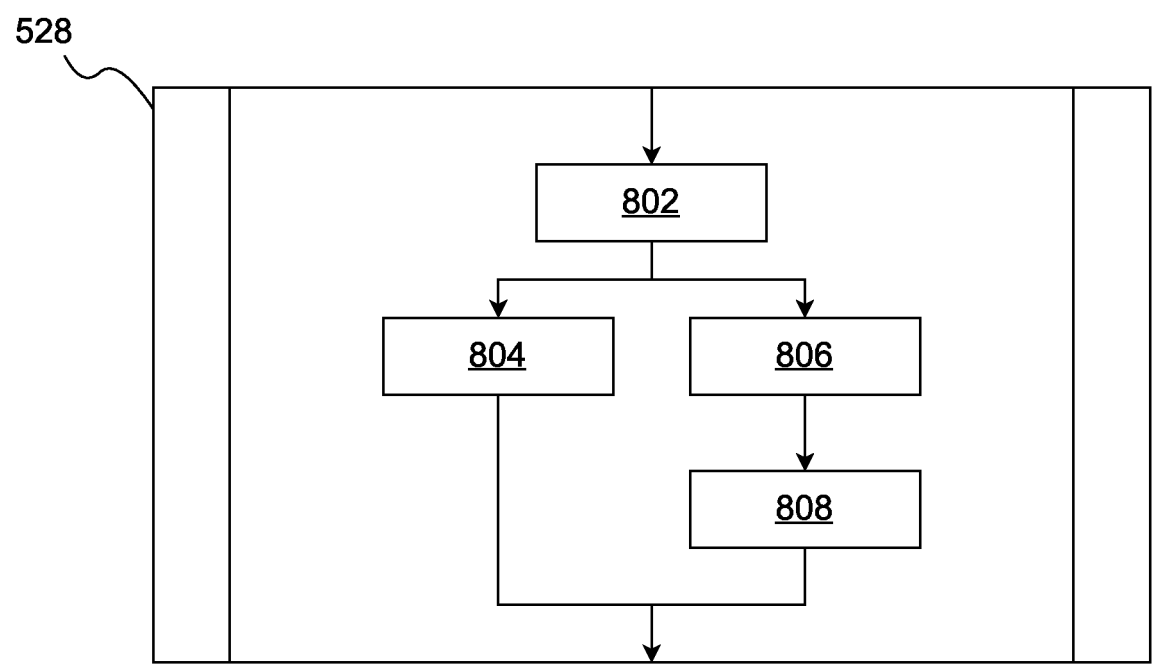
FIG. 8 is a flowchart of a method for sending and/or receiving information related to a deformation, according to an exemplary embodiment.

At block 528, the vehicle controller 14 uses the vehicle communication system 38 to send and/or receive information related to the deformation in the roadway surface 30 to a remote server. Referring to FIG. 8, a flowchart of an exemplary embodiment of block 528 is shown. The exemplary embodiment of block 528 begins at block 802. At block 802, the vehicle controller 14 uses the GNSS 36 to determine a location of the vehicle 12. After block 802, the exemplary embodiment of block 528 proceeds to blocks 804 and 806. At block 804, the vehicle controller 14 uses the vehicle communication system 38 to transmit the deformation severity classification of the deformation in the roadway surface 30 to the remote server system 80. In an exemplary embodiment, the deformation severity classification is transmitted with the location of the vehicle 12 determined at block 802. In a non-limiting example, the remote server system 80 stores the deformation severity classification and the location of the vehicle 12 in the database 84 for later retrieval. After block 804, the exemplary embodiment of block 528 is concluded and the method 500 proceeds.

At block 806, the vehicle controller 14 uses the vehicle communication system 38 to retrieve a quantity of severe deformations in the environment 32 surrounding the vehicle 12 from the remote server system 80. In an exemplary embodiment, the vehicle controller 14 first sends the location of the vehicle 12 determined at block 802 to the remote server system 80. Subsequently, the remote server system 80 retrieves a plurality of severe deformation severity classifications from the database 84. In a non-limiting example, each of the plurality of severe deformation severity classifications corresponds to a severe deformation in the roadway surface 30 within a predetermined radius (e.g., five hundred meters) of the location of the vehicle 12. A severe deformation is defined as a deformation having a deformation severity classification greater than or equal to a predetermined deformation severity classification threshold. For example, if the predetermined deformation severity classification threshold is medium severity, all deformations having a deformation severity classification of medium or high are determined to be severe deformations.

After retrieving the plurality of severe deformation severity classifications, the server controller 82 counts the plurality of severe deformation severity classifications to determine a quantity of severe deformations in the predetermined radius (i.e., in the environment 32 surrounding the vehicle 12). The server controller 82 then uses the server communication system 86 to transmit the quantity of severe deformations in the predetermined radius to the vehicle controller 14 via the vehicle communication system 38. After block 806, the exemplary embodiment of block 528 proceeds to block 808.

At block 808, a sampling rate of the system 10 and method 500 are adjusted based on the quantity of severe deformations in environment 32 surrounding the vehicle 12. In the scope of the present disclosure, the sampling rate is defined as a rate (e.g., measured in cycles per second) at which the method 500 repeatedly exits the standby state 530 and restarts the method 500 at block 502. In a first exemplary embodiment, the sampling rate is determined using a mathematical function (e.g., a linear function, an exponential function, a quadratic function, and the like) which relates the quantity of severe deformations in environment 32 surrounding the vehicle 12 to a sampling rate. In a non-limiting example, the mathematical function is determined such that there is positive correlation between the quantity of severe deformations in environment 32 surrounding the vehicle 12 and the sampling rate. In other words, if there is a large quantity of severe deformations in environment 32 surrounding the vehicle 12, the sampling rate is also large.

In a second exemplary embodiment, the sampling rate is determined using a lookup table (LUT) which maps a plurality of quantities of severe deformations in environment 32 surrounding the vehicle 12 to a plurality of sampling rates. After block 808, the exemplary embodiment of block 528 is concluded and the method 500 proceeds.

Referring again to FIG. 5, the method 500 exits the standby state 530 at the sampling rate. The sampling rate is determined at block 528 as discussed above. After entering the standby state at block 530, the method 500 proceeds to block 532. At block 532, if a sampling period (i.e., the inverse of the sampling rate) has elapsed since previously executing the method 500, the method 500 returns to block 502. If the sampling period has not yet elapsed since previously executing the method 500, the method 500 returns to enter the standby state at block 530. By adaptively adjusting the sampling rate based on the quantity of severe deformations in environment 32 surrounding the vehicle 12, the system 10 and method 500 may conserve resources by reducing the sampling rate when the roadway surface 30 is known to contain few deformations.

The system 10 and method 500 of the present disclosure offers several advantages. By detecting deformations in the roadway surface 30 (e.g., potholes) and quantifying a deformation severity classification, the occupant 42 may be notified, allowing the occupant 42 to take action to avoid driving the vehicle 12 over the deformation. Therefore, damage to the vehicle 12 may be mitigated and comfort of the occupant 42 may be increased. Furthermore, the system 10 and method 500 allow for detection and classification of water-filled deformations, which may present challenges for the occupant 42 to visually identify, especially in low-visibility conditions.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for determining a condition of a roadway a vehicle is traveling on, the system comprising:
    an illumination device configured to project a light beam onto a roadway surface;

a camera configured to capture an image of the light beam on the roadway surface;

a display configured to provide information related to the condition of the roadway to an occupant of the vehicle;

a vehicle controller in electrical communication with the illumination device, the camera, and the display, wherein the vehicle controller is programmed to:

project the light beam onto the roadway surface using the illumination device;

capture a plurality of images of the light beam on the roadway surface using the camera as the vehicle is in motion;

determine a severity of a deformation in the roadway surface based at least in part on the plurality of images of the light beam on the roadway surface, including generate a plurality of one-dimensional deformation matrices based at least in part on the plurality of images, wherein to generate one of the plurality of one-dimensional deformation matrices, the vehicle controller is further programmed to binarize one of the plurality of images to produce a binarized image, determine a plurality of deformation values for a plurality of points of the binarized image, wherein to determine the plurality of deformation values, the binarized image is compared to a reference image, and generate the one of the plurality of one-dimensional deformation matrices, wherein one of the plurality of deformation values is stored in each of a plurality of elements of the one of the plurality of one-dimensional deformation matrices; and notify the occupant of the vehicle using the display based at least in part on the severity of the deformation in the roadway surface.

2. The system of claim 1, wherein to determine the severity of the deformation in the roadway surface, the vehicle controller is further programmed to:

generate a two-dimensional deformation matrix based at least in part on the plurality of one-dimensional deformation matrices.

3. The system of claim 2, wherein the two-dimensional deformation matrix includes a plurality of rows and a plurality of columns, and wherein each of the plurality of rows of the two-dimensional deformation matrix is one of the plurality of one-dimensional deformation matrices.

4. The system of claim 3, wherein to determine the severity of the deformation in the roadway surface, the vehicle controller is further programmed to:

identify a plurality of distressed elements of the two-dimensional deformation matrix, wherein the deformation value of each of the plurality of distressed elements is greater than or equal to a predetermined deformation value threshold;

determine a vertical distress value of the two-dimensional deformation matrix based at least in part on the plurality of distressed elements;

determine a horizontal distress value of the two-dimensional deformation matrix based at least in part on the plurality of distressed elements;

determine an average depth of the deformation based at least in part on the plurality of deformation values of the two-dimensional deformation matrix;

determine at least one vehicle characteristic; and determine the severity of the deformation in the roadway surface based at least in part on the vertical distress value, the horizontal distress value, the average depth, a quantity of the plurality of distressed elements, and the at least one vehicle characteristic.

5. The system of claim 4, wherein to determine the vertical distress value, the vehicle controller is further programmed to:

determine a quantity of the plurality of distressed elements in each column of the two-dimensional deformation matrix; and calculate the vertical distress value of the two-dimensional deformation matrix using a formula:

$$V_D = \sum_{i=1}^{N_C-1} |Q_C[i+1] - Q_C[i]|$$

wherein $V_D$ is the vertical distress value, $N_C$ is a total number of columns in the two-dimensional deformation matrix, and $Q_C[i]$ is the quantity of the plurality of distressed elements in an ith column of the two-dimensional deformation matrix.

6. The system of claim 4, wherein to determine the horizontal distress value, the vehicle controller is further programmed to:

determine a quantity of the plurality of distressed elements in each row of the two-dimensional deformation matrix; and calculate the horizontal distress value of the two-dimensional deformation matrix using a formula:

$$H_D = \sum_{i=1}^{N_R-1} |Q_R[i+1] - Q_R[i]|$$

wherein $H_D$ is the horizontal distress value, $N_R$ is a total number of rows in the two-dimensional deformation matrix, and $Q_R[i]$ is the quantity of the plurality of distressed elements in an ith row of the two-dimensional deformation matrix.

7. The system of claim 4, wherein the severity of the deformation in the roadway surface is determined using a machine learning algorithm configured to receive the vertical distress value, the horizontal distress value, the average depth, the quantity of the plurality of distressed elements, and the at least one vehicle characteristic as inputs and produce a deformation severity classification of the deformation as an output.

8. The system of claim 7, wherein the system further comprises a global navigation satellite system (GNSS) in electrical communication with the vehicle controller and a vehicle communication system in electrical communication with the vehicle controller, and wherein the vehicle controller is further programmed to:

determine a location of the vehicle using the GNSS;

transmit the deformation severity classification of the deformation and the location of the vehicle to a remote server using the vehicle communication system;

retrieve a quantity of severe deformations in an environment surrounding the vehicle from the remote server using the vehicle communication system based at least in part on the location of the vehicle; and adjust a sampling rate of the system based at least in part on the quantity of severe deformations in the environment surrounding the vehicle.

9. The system of claim 1, wherein the display is an augmented reality head-up display (AR-HUD) system in electrical communication with the vehicle controller, wherein the AR-HUD system includes an occupant position tracking device and an AR-HUD projector, and wherein to notify the occupant of the vehicle, the vehicle controller is further programmed to:

determine a position of the occupant of the vehicle using the occupant position tracking device;

calculate a size, shape, and location of a graphic based on the position of the occupant; and display the graphic corresponding to the severity of the deformation in the roadway surface on a windscreen of the vehicle using the AR-HUD system based on the size, shape, and location.

10. A method for determining a condition of a roadway a vehicle is traveling on, the method comprising:

projecting a light beam onto a roadway surface using an illumination device;

capturing a plurality of images of the light beam on the roadway surface using a camera as the vehicle is in motion;

determining a severity of a deformation in the roadway surface based at least in part on the plurality of images of the light beam, including generating a plurality of one-dimensional deformation matrices based at least in part on the plurality of images, wherein generating the plurality of one-dimensional deformation matrices further comprises binarizing one of the plurality of images to produce a binarized image, determining a plurality of deformation values for a plurality of points of the binarized image, wherein to determine the plurality of deformation values, the binarized image is compared to a reference image, and generating the one of the plurality of one-dimensional deformation matrices, wherein one of the plurality of deformation values is stored in each of a plurality of elements of the one of the plurality of one-dimensional deformation matrices; and notifying an occupant of the vehicle using a display based at least in part on the severity of the deformation in the roadway surface.

11. The method of claim 10, wherein determining the severity of the deformation in the roadway surface further comprises:

generating a two-dimensional deformation matrix based at least in part on the plurality of one-dimensional deformation matrices, wherein the two-dimensional deformation matrix includes a plurality of rows and a plurality of columns, and wherein each of the plurality of rows of the two-dimensional deformation matrix is one of the plurality of one-dimensional deformation matrices.

12. The method of claim 11, wherein determining the severity of the deformation in the roadway surface further comprises: identifying a plurality of distressed elements of the two-dimensional deformation matrix, wherein the deformation value of each of the plurality of distressed elements is greater than or equal to a predetermined deformation value threshold;

determining a vertical distress value and a horizontal distress value of the two-dimensional deformation matrix based at least in part on the plurality of distressed elements; determining an average depth of the deformation based at least in part on the plurality of deformation values of the two-dimensional deformation matrix; determining at least one vehicle characteristic; and determining the severity of the deformation in the roadway surface using a machine learning algorithm configured to receive the vertical distress value, the horizontal distress value, the average depth, a quantity of the plurality of distressed elements, and the at least one vehicle characteristic as inputs and produce a deformation severity classification of the deformation as an output.

13. The method of claim 12, wherein determining the vertical distress value and the horizontal distress value further comprises:

determining a quantity of the plurality of distressed elements in each column of the two-dimensional deformation matrix;

calculating the vertical distress value of the two-dimensional deformation matrix using a formula:

$$V_D = \sum_{i=1}^{N_C-1} |Q_C[i+1] - Q_C[i]|$$

wherein $V_D$ is the vertical distress value, $N_C$ is a total number of columns in the two-dimensional deformation matrix, and $Q_C[i]$ is the quantity of the plurality of distressed elements in an ith column of the two-dimensional deformation matrix; and calculating the horizontal distress value of the two-dimensional deformation matrix using a formula:

$$H_D = \sum_{i=1}^{N_R-1} |Q_R[i+1] - Q_R[i]|$$

wherein $H_D$ is the horizontal distress value, $N_R$ is a total number of rows in the two-dimensional deformation matrix, and $Q_R[i]$ is the quantity of the plurality of distressed elements in an ith row of the two-dimensional deformation matrix.

14. The method of claim 12, further comprising:

determining a location of the vehicle using a global navigation satellite system (GNSS);

transmitting the deformation severity classification of the deformation and the location of the vehicle to a remote server using a vehicle communication system;

retrieving a quantity of severe deformations in an environment surrounding the vehicle from the remote server using the vehicle communication system based at least in part on the location of the vehicle; and adjusting a sampling rate of the method based at least in part on the quantity of severe deformations in the environment surrounding the vehicle.

15. The method of claim 10, wherein notifying the occupant of the vehicle further comprises:

determining a position of the occupant of the vehicle using an occupant position tracking device;

calculating a size, shape, and location of a graphic based on the position of the occupant; and displaying the graphic corresponding to the severity of the deformation in the roadway surface on a windscreen of the vehicle using an augmented reality head up display (AR-HUD) system based on the size, shape, and location.

16. A system for determining a condition of a roadway a vehicle is traveling on, the system comprising:

an illumination device configured to project a light beam onto a roadway surface;

a camera configured to capture an image of the light beam on the roadway surface;

an augmented reality head-up display (AR-HUD) system configured to provide information related to the condition of the roadway to an occupant of the vehicle;

a global navigation satellite system (GNSS) configured to determine a location of the vehicle;

a vehicle communication system configured to communicate with a remote server; and a vehicle controller in electrical communication with the illumination device, the camera, the AR-HUD system, the GNSS, and the vehicle communication system, wherein the vehicle controller is programmed to:

repeatedly execute a plurality of instructions based at least in part on a sampling rate, wherein the plurality of instructions includes:

determine a location of the vehicle using the GNSS;

retrieve a quantity of severe deformations in an environment surrounding the vehicle from the remote server using the vehicle communication system based at least in part on the location of the vehicle;

adjust the sampling rate based at least in part on the quantity of severe deformations in the environment surrounding the vehicle;

project the light beam onto the roadway surface using the illumination device;

capture a plurality of images of the light beam on the roadway surface using the camera as the vehicle is in motion;

determine a severity of a deformation in the roadway surface based at least in part on the plurality of images of the light beam, including generate a plurality of one-dimensional deformation matrices based at least in part on the plurality of images, wherein to generate one of the plurality of one-dimensional deformation matrices, the vehicle controller is further programmed to binarize one of the plurality of images to produce a binarized image, determine a plurality of deformation values for a plurality of points of the binarized image, wherein to determine the plurality of deformation values, the binarized image is compared to a reference image, and generate the one of the plurality of one-dimensional deformation matrices, wherein one of the plurality of deformation values is stored in each of a plurality of elements of the one of the plurality of one-dimensional deformation matrices; and notify the occupant of the vehicle using the AR-HUD system based at least in part on the severity of the deformation in the roadway surface.

17. The system of claim 16, wherein to determine the severity of the deformation in the roadway surface, the vehicle controller is further programmed to:

generate a two-dimensional deformation matrix based at least in part on the plurality of one-dimensional deformation matrices, wherein the two-dimensional deformation matrix includes a plurality of rows and a plurality of columns, and wherein each of the plurality of rows of the two-dimensional deformation matrix is one of the plurality of one-dimensional deformation matrices.

18. The system of claim 17, wherein to determine the severity of the deformation in the roadway surface, the vehicle controller is further programmed to:

identify a plurality of distressed elements of the two-dimensional deformation matrix, wherein the deformation value of each of the plurality of distressed elements is greater than or equal to a predetermined deformation value threshold;

determine a vertical distress value of the two-dimensional deformation matrix based at least in part on the plurality of distressed elements;

determine a horizontal distress value of the two-dimensional deformation matrix based at least in part on the plurality of distressed elements;

determine an average depth of the deformation based at least in part on the plurality of deformation values of the two-dimensional deformation matrix;

determine at least one vehicle characteristic; and determine the severity of the deformation in the roadway surface using a machine learning algorithm configured to receive the vertical distress value, the horizontal distress value, the average depth, the quantity of the plurality of distressed elements, and the at least one vehicle characteristic as inputs and produce a deformation severity classification of the deformation as an output.

* * * * *